May 30, 1933. A. LENKTIS 1,911,759

SAFETY GAS VALVE

Filed June 6, 1931

Adolph Lenktis INVENTOR

BY ATTORNEY

Patented May 30, 1933

1,911,759

UNITED STATES PATENT OFFICE

ADOLPH LENKTIS, OF BROOKLYN, NEW YORK

SAFETY GAS VALVE

Application filed June 6, 1931. Serial No. 542,475.

This invention relates to a safety gas valve and has for its object a device in the aforementioned class which excludes the possibility of being opened unintentionally. At the same time the features embodied in this device can be readily applied to gas valves used in any location and for any purpose, such as main shut-off valves, valves for gas heaters, gas ranges, etc.

Since the design offers a practical and foolproof safeguard against gas valves being opened accidentally, and since a valve constructed according to this invention can be operated with the same ease and convenience as the ordinary gas valves, it is thought that this invention represents considerable improvement over gas valves now commonly used.

With this object in view this invention consists of the novel features of construction and combination of elements as set forth in detail in the following specification and claims and illustrated in the accompanying drawing, in which:

Figures 1, 2:
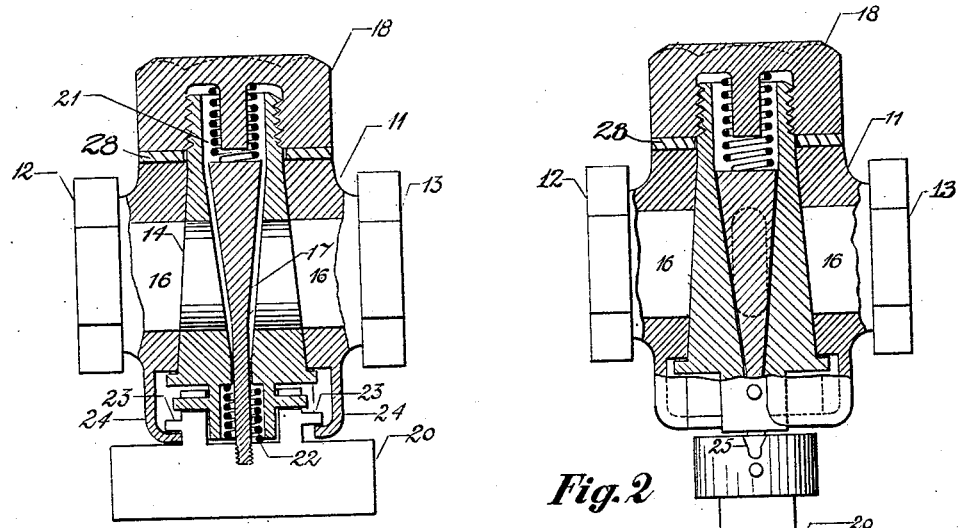
Fig. 1 is a cross sectional view of a gas valve constructed according to this invention, showing the valve open.
Fig. 2 is the same as Fig. 1, but the valve is illustrated closed.
Figure 3A:
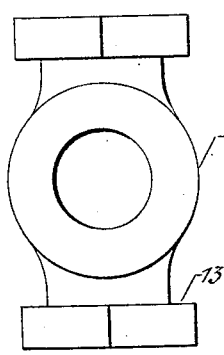
Figs. 3a, 3b and 3c are bottom, side and top views of the body of the valve, and finally.
Figure 3B:
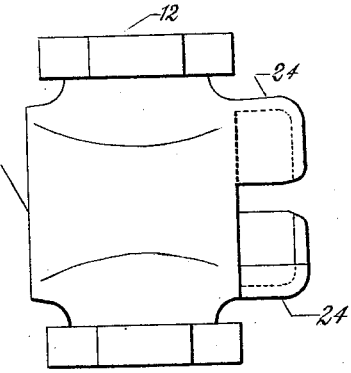
Figure 3C:
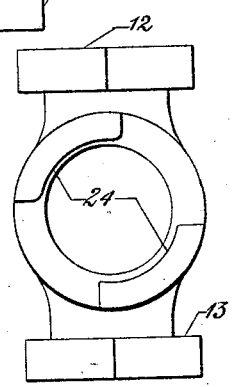
Figure 4:
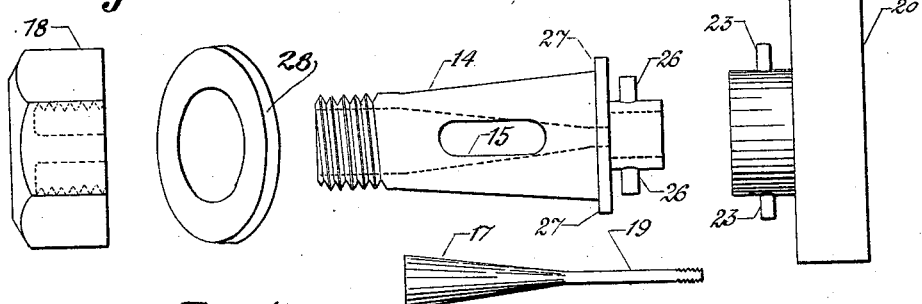
Fig. 4 shows the more important parts of the valve disassembled, the said parts being designated with the same reference numerals as on the assembly drawing Figs. 1 and 2.

Referring to Figs. 1 and 2, 11 designates the valve body, provided with coupling flanges 12 and 13 for attaching the valve to a pipe line or to a gas appliance. A conical seat is arranged in the said valve body, and the closing element 14 is rotatively arranged in the said seat. The closing element 14 is provided with an elongated passage way 15, and when this passage way registers with the corresponding opening 16 through the valve body, when other conditions are fulfilled as set forth in the following, the gas will flow through the valve. A special nut 18, threadly engaged with the end portion of the closing element 14, holds the said closing element tight against the conical seat provided in the valve body.

The closing element 14 is hollow and is formed inside with a conical seat, accommodating a cone-shaped check valve 17. The said check valve finishes in a stem 19 to which a handle 20 is engaged by means of screw threads. A spring 21, bearing against the bottom of the conical check valve 17, and another spring 22, bearing against the handle 20 force the check valve normally against its seat, as shown on Fig. 2, thereby obstructing the passage of gas through the closing element, even though the opening 15 of the latter would register with the opening through the valve body.

The valve may be opened by an upwardly pushing and simultaneous clock-wise rotating movement of the handle 20. By so doing the protruding pins 23 fastened to the handle will engage with the retaining flanges 24 fastened to the valve body 11, and thus the check valve 17 will be lifted off its seat and kept in such position, without the necessity of exerting further pressure against the springs 21 and 22, as illustrated in Fig. 1.

During the above described upward and rotating movement of the handle 20 the two slots 25 arranged thereon will engage two correspondingly located pins 26 on the closing element 14, thereby enabling the user to turn the said closing element. The degree of rotation will regulate the flow of gas, in the same way as in common gas valves; Fig. 1 shows the closing element in the full open position. By providing stops on the retaining flanges the movement of the handle 20 may be limited to approximately 90 degrees. The shoulder 27 is provided on the closing element 14 for the purpose of preventing the latter from seating deeper than necessary into its seat provided in the valve body and consequent binding of the valve body.

When it is desired to close the valve, a simple rotative movement of the handle 20, in a direction opposite to that used for opening, will bring the closing element, check valve and handle from their position shown in Fig. 1 into that illustrated in Fig. 2.

A washer 28, inserted between the special nut 18 and the valve body 11, serves the purpose of hermetically closing the latter, and preventing undue friction, when tightening the aforesaid nut 18.

From the foregoing description of the operation of the valve it will be evident that it can be opened only by an upward pushing and clock-wise rotating movement, whereby the possibility of accidental opening is eliminated. This safety feature is of vital importance in the home where minors have access to gas valves, since it frequently happens that children turn gas valves without lighting the corresponding gas jet. It will be recognized from the construction of the valve covered by this invention that turning the handle 20 alone will not open this valve, this condition being obtainable only through deliberate and conscious effort.

While I have shown and described the preferred embodiment of my invention with some degree of detail, it is to be understood that in practice various modifications may be resorted to without departing from the spirit and scope of the appended claims, and I do not, therefore, desire to be limited to the precise construction illustrated in the drawing and described in the foregoing specification.

What I desire to claim and protect by Letters Patent of the United States is:

1. In a safety gas valve the combination of a valve body having retaining flanges, a closing element provided with a passage for the gas through it; a check valve mounted inside the said closing element; a stem in continuation of said check valve, a disengageable handle fastened to the above stem, the said handle being provided with pins; springs having normally the tendency of pressing the check valve against the passage in the closing element; the engagement of the pins on the handle with the retaining flanges on the valve body maintaining the check valve in its open position against the pressure of the aforementioned springs, substantially as shown and described.

2. A safety gas valve comprising a valve body having retaining flanges, a closing element provided with a passage for the gas flow, a check valve mounted inside the said closing element, a stem in continuation of the said check valve, a washer, a disengageable handle fastened to the said stem, the said handle being provided with pins, and springs above and below, having normally the tendency of pressing the check valve against the passage of the said closing element.

Signed at New York city in the county of New York and State of New York this 6th day of May A. D. 1931.

ADOLPH LENKTIS.